T. P. TROKE.
CONVERTIBLE VEHICLE BODY.
APPLICATION FILED JAN. 3, 1921.
1,415,209.
Patented May 9, 1922.
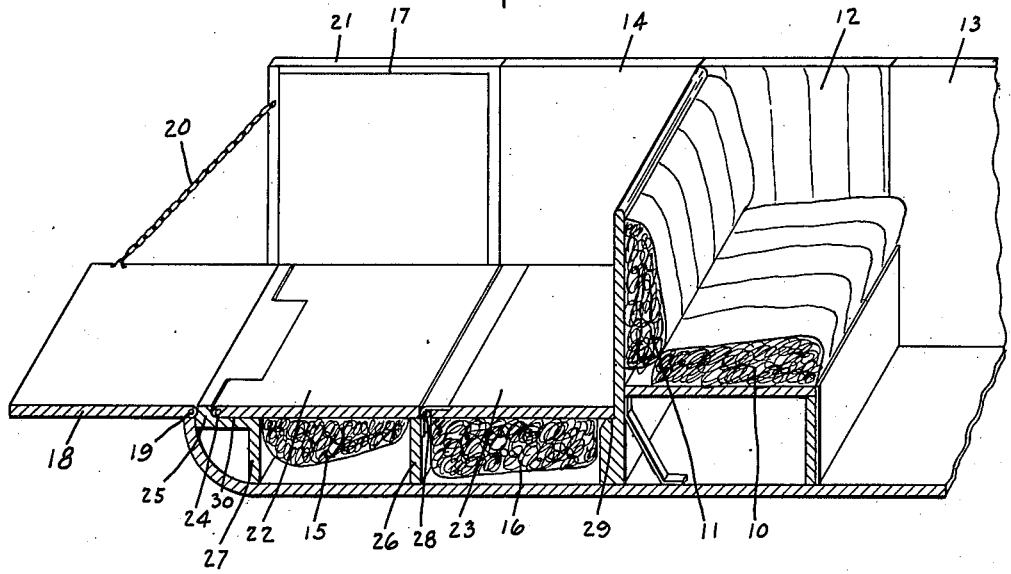
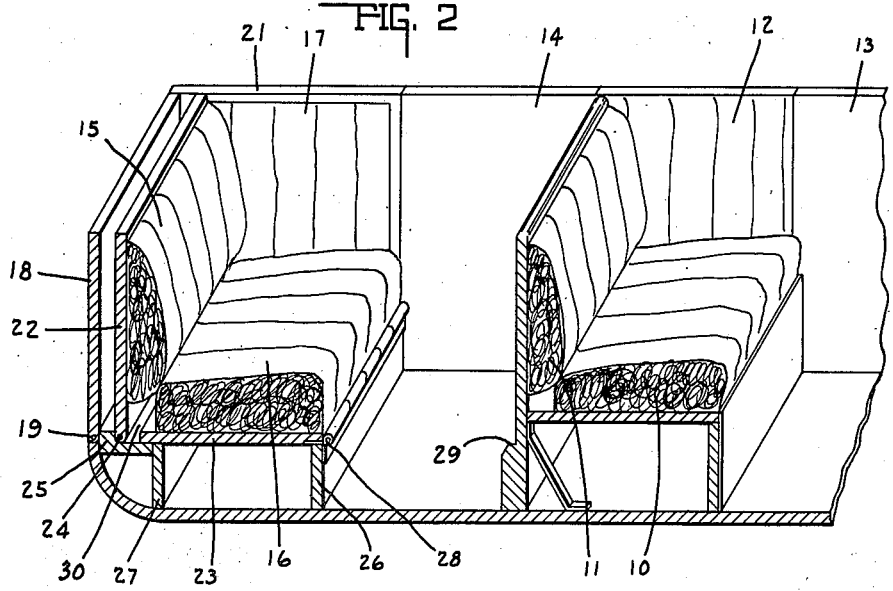
INVENTOR.
THOMAS P. TROKE.
BY
ATTORNEYS.

UNITED STATES PATENT OFFICE.

THOMAS P. TROKE, OF INDIANAPOLIS, INDIANA.

CONVERTIBLE VEHICLE BODY.

1,415,209. Specification of Letters Patent. Patented May 9, 1922.

Application filed January 3, 1921. Serial No. 434,582.

*To all whom it may concern:*

Be it known that I, THOMAS P. TROKE, a citizen of the United States, and a resident of Indianapolis, county of Marion, and State of Indiana, have invented a certain new and useful Convertible Vehicle Body; and I do hereby declare that the following is a full, clear, and exact description thereof, reference being had to the accompanying drawings, in which like numerals refer to like parts.

This invention relates to convertible vehicle bodies wherein a vehicle body may be converted as desired into a passenger vehicle or a commercial or freight receiving vehicle body.

The chief object of this invention is to provide a vehicle body with means such that the same may be changed or converted as desired into a passenger vehicle or a commercial vehicle.

The chief feature of the invention consists in providing seat forming panels and positioning the same such that said panels may be moved from the seat forming position into a freight receiving position.

Another feature of the invention consists in providing the back of the vehicle body with a portion which is adapted to serve as a tail gate when desired.

Another feature of the invention consists in constructing the parts and arranging the same such that said convertible portions may still be convertible, although the vehicle body be equipped with the usual top covering means.

The full nature of this invention will be understood from the accompanying drawings and the following description and claims.

In the drawings Fig. 1 is a perspective view of the invention, one of the sides being broken away to show the construction in detail, the parts being shown in the freight receiving position. Fig. 2 is a similar view of said parts but shows the same in the passenger receiving position.

In the drawings 10 indicates the bottom or seat forming panel of the front or driver's seat and 11 the back seat forming panel of said seat, while 12 indicates the usual side panels adjacent the usual foredoors 13 of the driver's compartment. The vehicle body is also provided with the usual rear door 14, although the same is not necessary and forms no part of the invention.

The rear seat is composed of a back seat forming panel 15, a bottom or base seat forming panel 16 and the usual side panels 17. The side panel 17 may be so constructed that the same is removable from the seat forming position to a non-exposed position. This may be accomplished by providing the same with a suitable covering or the side panel 17 may be reversed in position or removed entirely from said positions and inserted in suitable pockets provided therefor. Any of these methods may be utilized as desired.

The back of the body herein designated by the numeral 18 is preferably separated from the remainder of the body and is preferably hinged thereto at its lower edge 19 by suitable hinge means. Thus, the back forming portion 18 is adapted to be moved from the position shown in Fig. 2 to the position shown in Fig. 1, thereby serving as a tail gate, and when so used is adapted to be secured in a horizontal position or any intermediate position by suitable chain means 20. The tail gate 18 may be provided with suitable latch means so as to be maintained in the position shown in Fig. 2 when the vehicle is to be used as a closed vehicle, whether to contain passengers or to contain small articles. It will be noted, therefore, since the usual top construction is supported by the side portions 21, said top may be utilized with the foregoing construction without requiring any change and, therefore, the vehicle may be covered and enclosed whether serving as a passenger vehicle or as a commercial vehicle.

The rear seat forming panels 15 and 16 are preferably provided with suitable base portions 22 and 23 respectively, each being suitably hinged such that the same will be hingedly supported by the vehicle. The back forming portion 15 is suitably hinged at 24 to a stationary portion 25, which in the present instance is adapted to form a portion of the base or bottom of the freight receiving compartment when the seat forming portions are moved into said relation. Suitable means, such as a pair of transversely extending members 26 and 27 support the base seat forming panel when in seat forming position. The panel 16 is preferably hinged at 28 by any suitable means and said seat forming panel 16 is movable from the position shown in Fig. 2 to the position shown in Fig. 1, thereby presenting the back or base plate means 23 to the compartment for receiving freight and thereby protecting the upholstering and cushion means 16 from injury when the rear compartment is to be used as a freight compartment instead of a passenger compartment. Suitable means such as a flange 29, in this instance formed as a portion of the back of the front seat, supports the front end of the panel 23 in the freight receiving position. Other means may be associated with the free edge of the plate 23, which may be movable into a position to support said plate when the latter is in the position shown in Fig. 1, if desired. When such means are used said means may be folded in the space 30 formed between the two cushion portions 15 and 16. The support for said seat, however, is preferably constructed as shown. The back forming panel of the rear seat is movable from the substantially vertical position shown in Fig. 2 to a horizontal position shown in Fig. 1. In this instance the back forming cushion 15 rests between the two supporting members 26 and 27 and the back forming plate or panel 22 rests upon said supporting members, thereby forming a flush or flat surface by means of the members 18, 25, 23 and 22. When small articles are to be transported by the vehicle, when in a freight forming relation, the tail gate 18 is maintained in the elevated position shown in Fig. 2 by suitable latch means, not shown.

It will also be understood that when the seat forming panels 15 and 16 are in the seat forming position the tail gate panel 18 may be positioned as shown in Fig. 2 or may be positioned as shown in Fig. 1. When so positioned said tail gate portion is adapted to support suitable traveling cases or a trunk or a locker. Suitable means not shown is, therefore, associated with the base or panel 22 to maintain said panel in the substantially vertical position or back forming position shown in Fig. 2.

While the invention has been described in great detail, it will be readiy understood that various modifications thereof will readily suggest themselves to those skilled in the art to which this invention applies, and these modifications are all considered to be within the broad purview of this invention as outlined by the appended claims.

The invention claimed is:

1. A convertible vehicle body including a seat panel, a back rest panel of substantially the same size, a pair of transverse supporting standards spaced apart substantially the width of the panels, said seat panel being pivotally supported at its forward edge upon one of said supporting standards and movable forwardly from the seat forming position into an inverted horizontal position and the back rest panel being pivotally supported at its lower edge upon the rear supporting standard and movable forwardly into horizontal position to rest upon said forward supporting standard when the seat panel is moved forwardly, said panels when in the forward position forming a continuous flat surface, and a third supporting standard engageable by and supporting said seat forming panel in its forward position.

2. A convertible vehicle body including a seat panel, a back rest panel substantially the same size, three transverse supporting standards spaced apart substantially the width of the panels, said seat forming panel being pivotally supported at one edge upon the middle supporting standard and having its other edge resting upon the rear supporting standard and movable forwardly into horizontal position to rest upon the forward supporting standard, and the back rest panel being pivotally supported at its lower edge upon the supporting standard and movable forwardly into horizontal position after the seat panel has been moved forwardly and having its forward edge resting upon said middle supporting standard when in forward position, said panels when in forward position forming a continuous flat surface.

3. A convertible vehicle body including a cushion seat panel, a cushion back rest substantially the same size, three transverse supporting standards spaced apart substantially the width of the cushion panels, said seat panel being pivotally supported at one edge upon the middle supporting standard and having its other edge resting upon the rear supporting standard and movable forwardly into horizontal position to rest upon the forward supporting standard, the cushion of said seat panel being positioned between said forward and middle supporting standards, and the back rest panel being pivotally supported at its lower edge upon the rear supporting standard and movable forwardly into horizontal position after the seat panel has been moved forwardly and having its forward edge resting upon said middle supporting standard when in forward position, the cushion thereof being receivable by the space between the middle and rear supporting standards, said panels when in their forward position, forming a continuous flat surface.

In witness whereof, I have hereunto affixed my signature.

THOMAS P. TROKE.